(12) United States Patent
Kikuchi et al.

(10) Patent No.: US 6,434,350 B2
(45) Date of Patent: Aug. 13, 2002

(54) ELECTROPHOTOGRAPHIC RECORDING APPARATUS HAVING LID WITH MECHANISM TO RETRACT EXPOSING UNIT

(75) Inventors: Hiroshi Kikuchi; Yukio Ota, both of Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/794,120

(22) Filed: Feb. 28, 2001

(30) Foreign Application Priority Data

Mar. 9, 2000 (JP) ........................................ 2000-064515

(51) Int. Cl.[7] .......................... G03G 15/00; G03G 21/00
(52) U.S. Cl. ........................................ 399/124; 399/125
(58) Field of Search .......................... 399/4, 124, 125, 399/177, 186, 380; 347/130, 138

(56) References Cited

U.S. PATENT DOCUMENTS

| | | | | |
|---|---|---|---|---|
| 3,944,367 A | * | 3/1976 | Hakanson et al. | 355/76 |
| 4,449,811 A | * | 5/1984 | Betron et al. | 399/380 |
| 4,905,028 A | * | 2/1990 | Okubo et al. | 347/138 |
| 5,291,249 A | * | 3/1994 | Lee | 399/125 X |
| 5,477,306 A | * | 12/1995 | Iguchi et al. | 347/130 X |
| 5,978,626 A | * | 11/1999 | Nagamine et al. | 399/125 |
| 6,252,619 B1 | * | 6/2001 | Ueda et al. | 399/125 X |

* cited by examiner

Primary Examiner—Fred L Braun
(74) Attorney, Agent, or Firm—Rabin & Berdo, P.C.

(57) ABSTRACT

An electrophotographic recording apparatus has a lid movable to open and close relative to a body of the apparatus, the lid having an exposing unit mounted thereto. The recording apparatus includes a collapsible mechanism and a drive mechanism (gear mechanism). The exposing unit is suspended from the collapsible mechanism. The gear mechanism is operatively connected to the lid so that when the lid is opened and closed, the gear mechanism drives the collapsible mechanism to deform selectively into the collapsed position and the expanded position, respectively. When the collapsible mechanism is at the expanded position, the exposing unit is accurately positioned relative to an image-forming unit. When the collapsible mechanism is at the collapsed position, the exposing unit is at a retracted position so that the exposing unit allows easy access to the interior of the apparatus. The gear mechanism may include a torque limiter.

11 Claims, 13 Drawing Sheets

ELECTROPHOTOGRAPHIC RECORDING APPARATUS HAVING LID WITH MECHANISM TO RETRACT EXPOSING UNIT

BACKGROUND OF THE INVENTION

1. Field of the Invention

The present invention relates to printing apparatus such as electrophotographic copying machines and electrophotographic printers, and more particularly to an electrophotographic recording apparatus having an exposing unit on a cover thereof.

2. Description of the Related Art

With conventional printing apparatus such as electrophotographic copying machines and electrophotographic printers, the operator opens a lid to replace an image-forming unit and/or a toner cartridge or to remove jammed paper. The lid is usually of simple construction in which the lid is opened and closed substantially in a vertical direction.

Among the electrophotographic printers on the market is one in which, for example, an LED head as an exposing unit used for electrophotography is mounted on a lid. Such a printer includes four LED heads for forming yellow, magenta, cyan, and black images on corresponding image forming units.

However, such a conventional electrophotographic recording apparatus having LED heads suffers from the problem that when the operator opens a lid to replace an image-forming unit and/or a toner cartridge or to remove jammed paper, the LED heads that project downward from the lid interfere with the operator's hands. In order that the LED heads do not interfere with the operator's hands, the lid should be designed to open wider.

SUMMARY OF THE INVENTION

The present invention was made in view of the aforementioned drawbacks of the conventional apparatus.

An object of the invention is to provide an electrophotographic recording apparatus in which when the user replaces a toner cartridge and/or image forming unit or removes jammed paper, an exposing unit does not obstruct the operations.

An electrophotographic recording apparatus according to the invention has a lid movable to open and close relative to a body of the apparatus, the lid having an exposing unit mounted thereto. The recording apparatus comprises a collapsible mechanism and a gear mechanism. The collapsible mechanism can be selectively deformed into a collapsed position and into an expanded position. The gear mechanism drives the collapsible mechanism to deform selectively into the collapsed position and the expanded position. When the lid is opened, the collapsible mechanism causes the exposing unit to move to a retracted position. When the lid is closed, the collapsible mechanism causes the exposing unit to move to an extended position. When the lid is opened and closed, said gear mechanism operates operatively with the lid to cause the collapsible mechanism to be selectively deformed into the collapsed position and into the expanded position.

The exposing unit extends longitudinally and has a first longitudinal end and a second longitudinal end. When the lid is opened, one of the first and second longitudinal ends is moved to the retracted position.

The exposing unit is mounted to the collapsible mechanism through a biasing member. When the lid is closed, the collapsible mechanism is deformed into the expanded position so that the exposing unit is placed in position with respect to an image-forming unit and the biasing member urges the exposing unit against the image-forming unit.

The gear mechanism may include a torque limiter.

The exposing unit extends substantially parallel to an axis about which the lid pivots to open and close.

The exposing unit extends in a direction substantially perpendicular to an axis about which the lid pivots to open and close.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

Embodiments of the invention will be described in detail with reference to the accompanying drawings.

First Embodiment

{Construction}

Embodiments of the invention will be described with respect to an electrophotographic printer as an electrophotographic recording apparatus. The electrophotographic printer incorporates an LED head as an exposing unit.

Figure 1:
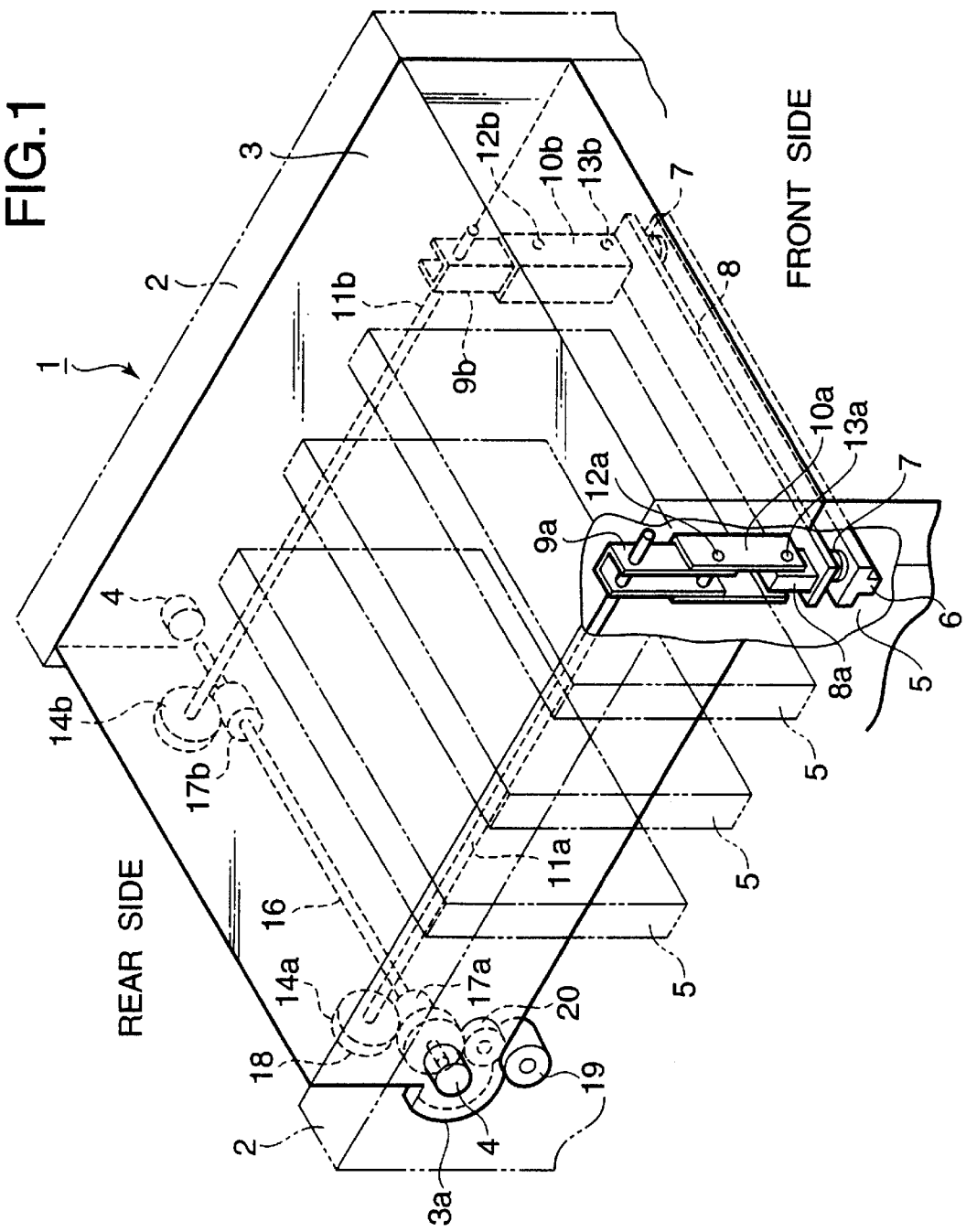
FIG. 1 is a perspective view of a pertinent portion of an electrophotographic printer according to a first embodiment of the invention.

FIG. 1 is a perspective view of a pertinent portion of an electrophotographic printer according to a first embodiment of the invention.

Referring to FIG. 1, an electrophotographic printer 1 has a body 2. The lid 3 is pivotally assembled to the main frame of the body 2. The lid 3 has a pair of supporting projections 4 on the left and right ends thereof. A sector gear 3a is formed on the left side of the lid 3 in one-piece construction with the lid 3 such that the sector gear 3a is rotatable about an axis passing through the centers of the pair of supporting projections 4. The lid 3 has a pair of support shafts 11a and 11b that are rotatably supported by bearings, not shown, and extend parallel to each other.

There are four LED assemblies 5 assembled to an inner surface of the lid 3, the LED assemblies 5 being aligned at equal intervals. FIG. 1 shows only one of the LED assemblies 5 in detail and three others in phantom lines. The four LED head assemblies 5 are provided because the electrophotographic printer according to the first embodiment is a color printer. If an electrophotographic printer is a monochrome printer, only one LED head assembly is required. Each of the LED head assemblies 5 includes an LED head 6, a pair of compression springs 7, a sub plate 8, a pair of base links 9a and 9b, and a pair of interconnecting links 10a and 10b.

The base links 9a and 9b and the interconnecting links 10a and 10b have a U-shaped cross section. The base links 9a and 9b have top end portions firmly connected to front end portions of the support shafts 11a and 11b, respectively. The lower end portions of the base links 9a and 9b partially enter the upper end portions of the interconnecting links 10a and 10b such that the base links are pivotally coupled to corresponding the interconnecting links by means of coupling pins 12a and 12b.

Figure 2:
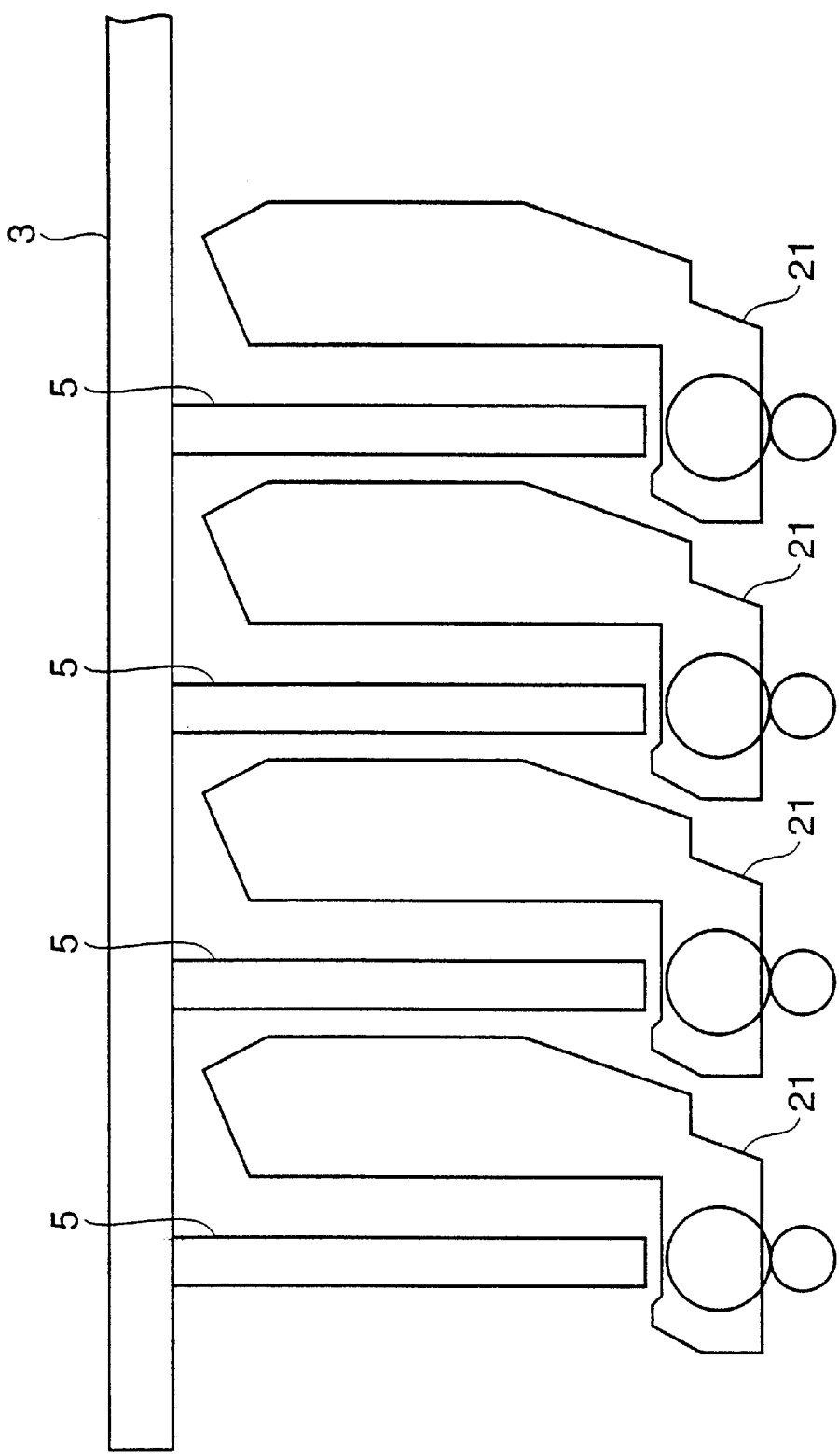
FIG. 2 is a side view of the LED assemblies and associated structural elements of the image recording apparatus.

FIG. 2 is a side view of the LED assemblies 5 and associated structural elements of the printer. Referring to FIG. 2, the four LED head assemblies 5 are mounted to the lid 3 such that they face corresponding image-forming units 21 accurately when the lid 3 is completely closed.

Figure 3:
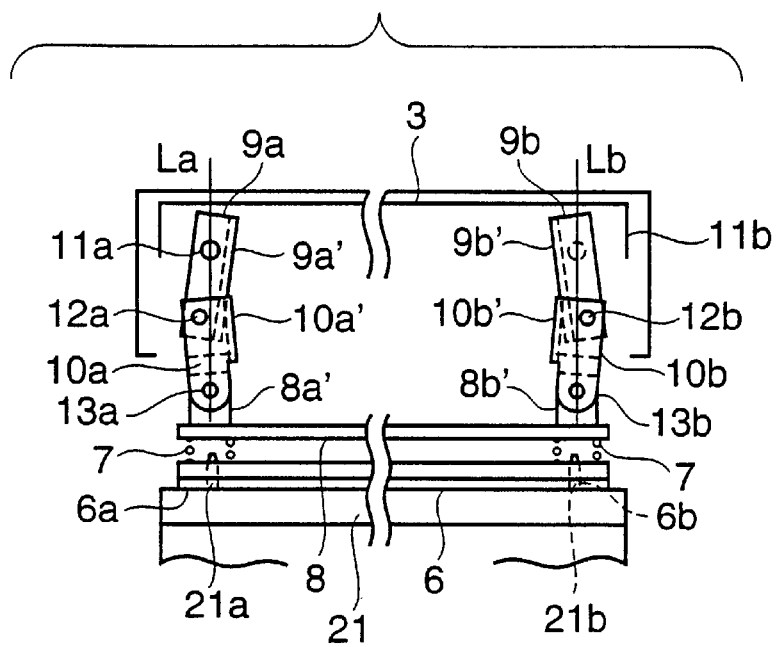
FIG. 3 is a fragmentary front view of a pertinent portion of the first embodiment when the lid is opened.

FIG. 3 is a fragmentary front view of a pertinent portion of the first embodiment when the lid 3 is opened.

Referring to FIG. 3, the interconnecting link 10a is pivotal clockwise about a coupling pin 13a but is prevented from pivoting counterclockwise due to the fact that when the interconnecting link 10a pivots counterclockwise, the upper portion of the interconnecting link 10a abuts the lower end portion of the base link 9a. Specifically, the interconnecting link 10a is prevented from further pivoting counterclockwise when the interconnecting link 10a pivots such that the coupling pin 12a is outside of a line La connecting the support shaft 11a and the coupling pin 13a.

The relation between the lower end portion of the base link 9a and the interconnecting link 10b is similar to that between the lower end portion of the base link 9a and the interconnecting link 10a. In other words, the interconnecting link 10b is pivotal clockwise about a coupling pin 13b but is prevented from pivoting counterclockwise due to the fact that the upper portion of the interconnecting link 10b abuts the lower end portion of the base link 9b. Specifically, the interconnecting link 10b is prevented from further pivoting counterclockwise when the interconnecting link 10b pivots such that the coupling pin 12b is outside of a line Lb connecting the support shaft 11b and the coupling pin 13b.

The lower end portions of the interconnecting links 10a and 10b are coupled to upward projections 8a and 8b, formed on the left and right end portions of the support plate 8, by means of the coupling pins 13a and 13b, respectively. Each of the compression springs 7 has one end thereof connected to the underside of the support plate 8 and the other end thereof connected to the LED head 6. The LED head 6 is suspended from the supporting plate 8 by means of the compression springs 7. The LED head 6 has engagement holes 6a and 6b (FIG. 3) formed in longitudinal end portions thereof.

Disposed below the respective LED heads 6 are corresponding image-forming units 21. Each of the image-forming units 21 has pilot pins 21a and 21b that correspond to the engagement holes 6a and 6b of the LED head 6, respectively. When the pilot pins 21a and 21b enter the engagement holes 6a and 6b, respectively, the LED heads 6 are placed in position.

Figure 4:
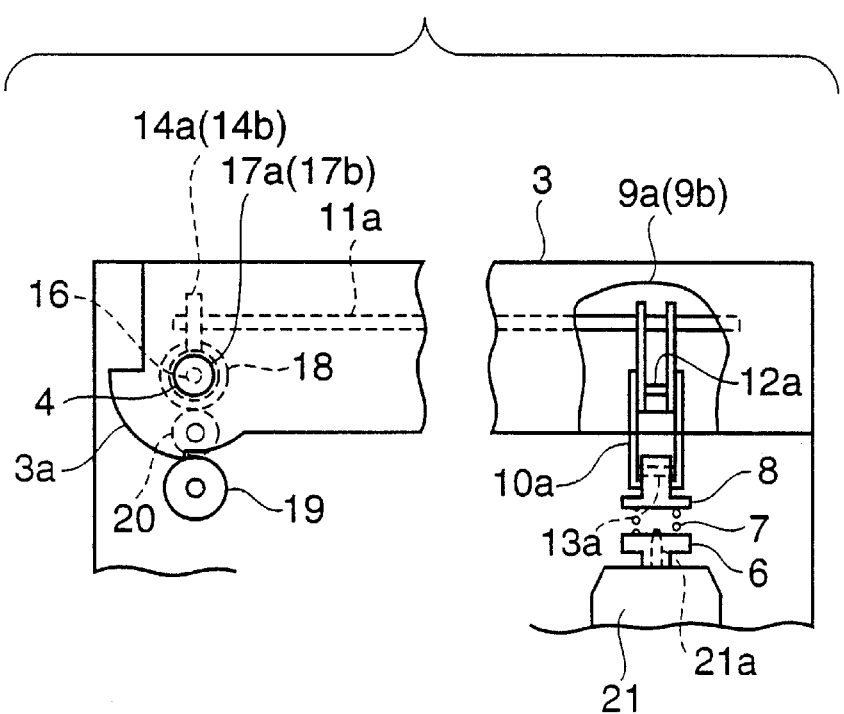
FIG. 4 is a fragmentary side view of a pertinent portion of the first embodiment when a lid is completely closed.

FIG. 4 is a fragmentary side view of a pertinent portion of the first embodiment when the lid 3 is completely closed.

Referring to FIGS. 1 and 4, the support shafts 11a and 11b have worm wheels 14a and 14b secured to the rear end portions of the support shafts 11a and 11b. The shaft 16 is in line with the pair of supporting projections 4 formed in the lid 3 but not coupled to the supporting projections 4. The shaft 16 is rotatably supported by bearings, not shown, provided on the lid 3. The shaft 16 also has worm gears 17a and 17b and an idle gear 18, which are secured to the shaft 16. The worm gears 17a and 17b are in mesh with worm wheels 14a and 14b, respectively, and the idle gear 18 is disposed close to the sector gear 3a.

Referring to FIG. 1, a main gear 19 is rotatably supported on a rear end of the body 2 near the sector gear 3a. The main gear 19 is in mesh with a sub gear 20 rotatably supported on the body 2. When the main gear 19 moves into meshing engagement with the sector gear 3a, the pivotal motion of the lid 3 is transmitted from the main gear 19 to the idle gear 18. The pivotal motion is further transmitted from the idle gear 18 to the support shaft 11a and 11b through the worm gears 17a and 17b and worm wheels 14a and 14b. The sector gear 3a is shaped such that the sector gear 3a moves into meshing engagement with the main gear 19 after the lid 3 has pivoted to a certain angle from a position where the lid 3 is completely closed to a position where the lid is partially opened.

{Operation of the First Embodiment}
{Opening Operation}

FIGS. 5–8 illustrate the opening operation of the lid according to the first embodiment.

The opening operation of the lid 3 will now be described with reference to FIGS. 5–8. When the lid 3 is completely closed as shown in FIG. 3, the upper end portions of the interconnecting links 10a and 10b abut the lower end portions of the base links 9a and 9b, respectively, preventing the interconnecting links 10a and 10b from further pivoting. Thus, the LED head assembly 5 is firmly positioned with the aid of the urging forces of the compression springs 7.

Figure 5:
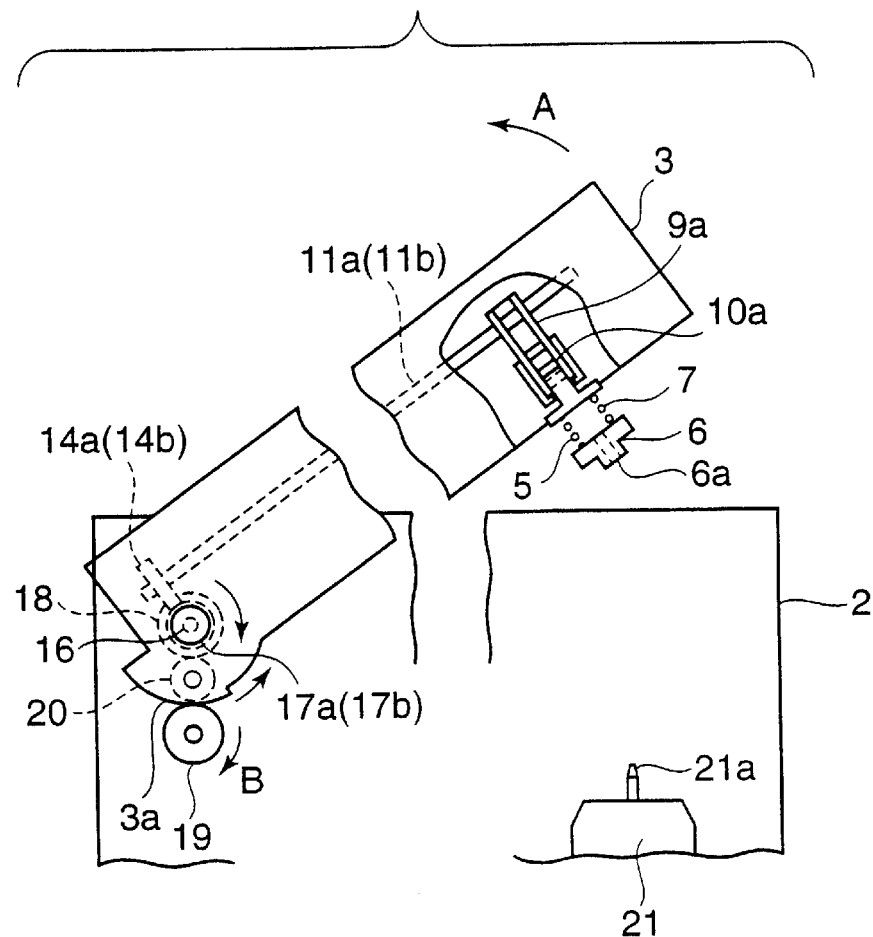
FIGS. 5–8 illustrate the opening operation of the lid according to the first embodiment.

After the operator unlocks the lid 3 by operating a locking mechanism, not shown, the operator raises the lid 3 such that the lid 3 pivots from the closed position shown in FIG. 4 in a direction shown by arrow A of FIG. 5. At this moment, the sector gear 3a is not in mesh with the main gear 19 yet. The pin holes 6a and 6b of the LED head 6 will move out of engagement with the pilot pins 21a and 21b of the image-forming unit 21 before the sector gear 3a moves into meshing engagement with the main gear 19. When the lid 3 is further opened, the sector gear 3a moves into meshing engagement with the main gear 19, so that the main gear 19 rotates clockwise as shown by arrow B in FIG. 5. Then, the rotary motion of the main gear 19 is transmitted to the idle gear 18. The idle gear 18 then transmits the rotary motion to the support shafts 11a and 11b through the warm gears 17a and 17b, respectively. As a result, the support shaft 11a rotates in a direction shown by arrow C (counterclockwise) in FIG. 6, and the support shaft 11b rotates in a direction shown by arrow D (clockwise).

Figure 6:
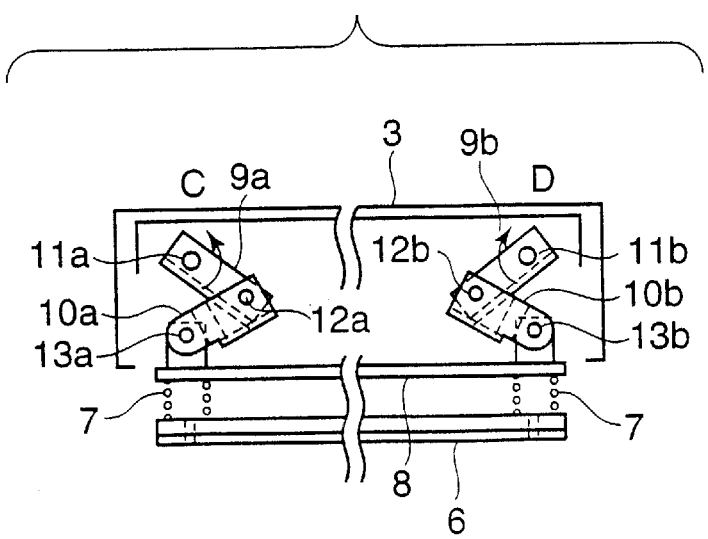

As the support shaft 11a rotates, the base link 9a and interconnecting link 10a collapse such that one is folded over the other as shown in FIG. 6. Likewise, as the support shaft 11b rotates, the base link 9b and interconnecting link 10b collapse such that one is folded over the other. As the base links 9a and 9b and the interconnecting links 10a and 10b collapse, the LED head assembly 5 is deformed from an expanded position toward a collapsed position.

Figure 7:
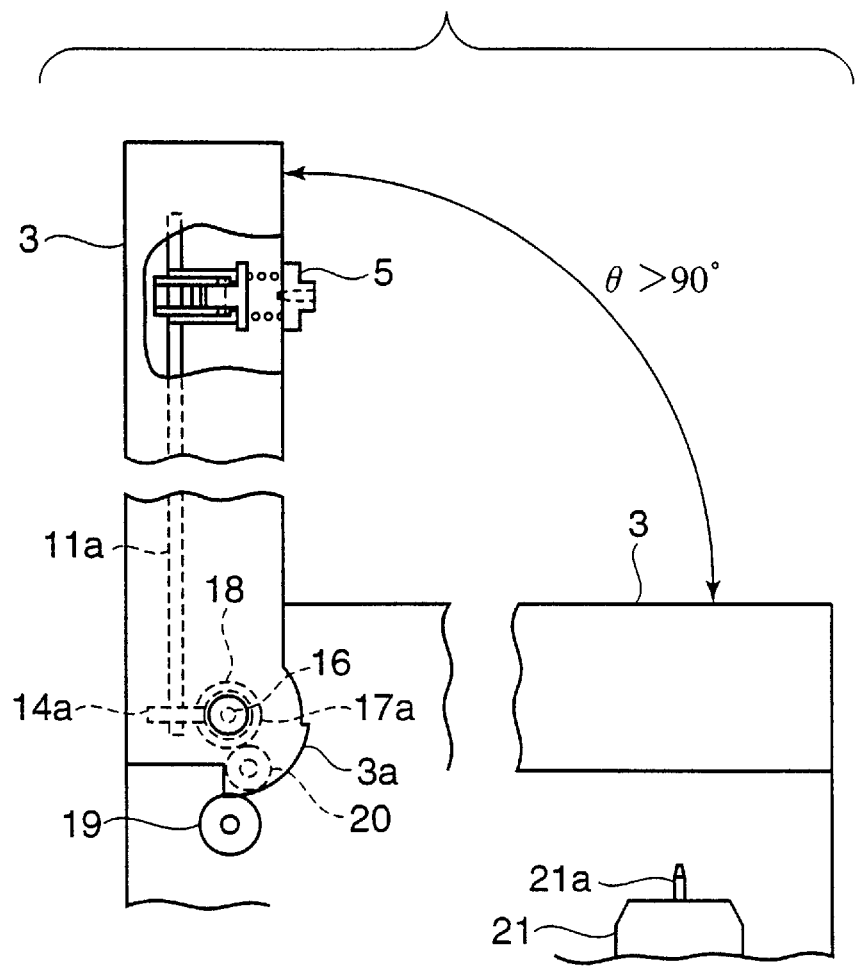
Figure 8:
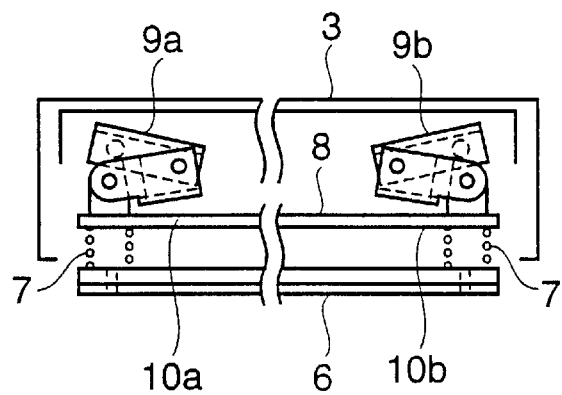
Figure 9:
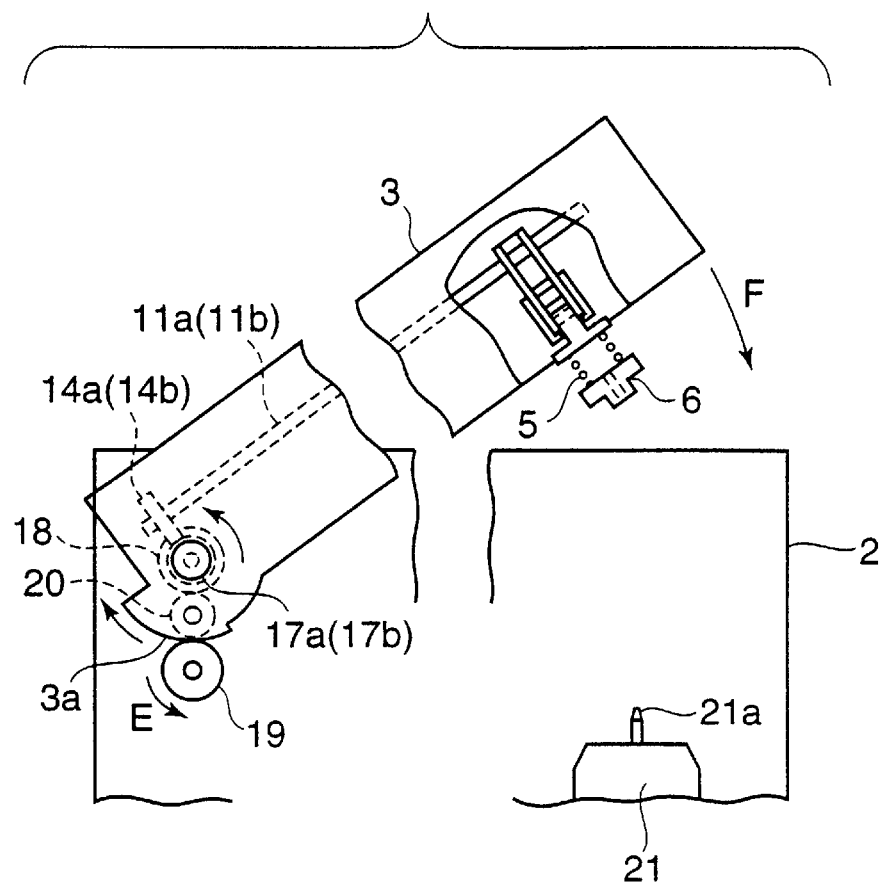
FIGS. 9–12 illustrate the closing operation of the first embodiment.

When the lid 3 has been fully opened as shown in FIG. 7, the LED assembly 5 has completely collapsed as shown in FIG. 8. The lid 3 is at its open position where the lid 3 is at an angle greater than 90 degrees with respect to its closed position and is held at the open position.

Then, with the lid 3 opened, the operator replaces the toner cartridge and/or the image-forming unit or removes jammed paper. Since the LED assemblies are at their collapsed positions, the LED assemblies 5 do not interfere with the operator's hands, facilitating replacement of the toner cartridge and/or the image-forming unit or removal of the jammed paper.

{Closing Operation}

FIGS. 9–12 illustrate the closing operation of the first embodiment.

Figure 10:
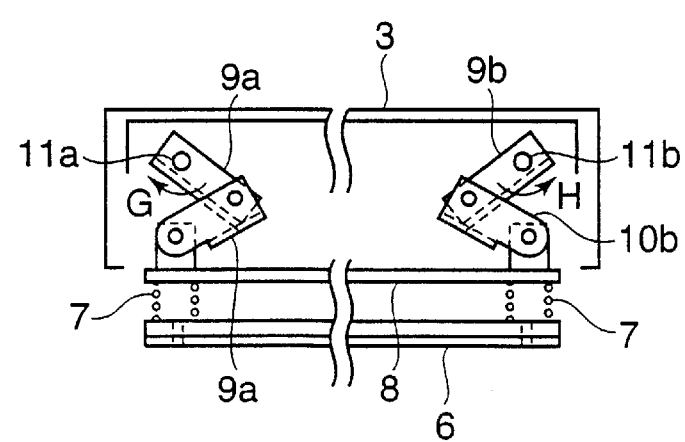

When the lid 3 is fully opened as shown in FIG. 7, the sector gear 3a is in meshing engagement with the main gear 19. As the operator closes the lid 3 in a direction shown by arrow F as shown FIG. 9, the sequence of the aforementioned opening operation is reversed. In other words, referring to FIG. 9, the main gear 19 rotates counterclockwise shown by arrow E, and the rotary motion of the main gear 19 is transmitted to the idle gear 18 through the sub gear 20. The rotary motion of the idle gear is then transmitted to the support shafts 11a and 11b through the worm gear gears 17a and 17b and worm wheels 14a and 14b. Then, as shown in FIG. 10, the support shaft 11a rotates in a direction shown by arrow G (clockwise) while the support shaft 11b rotates in a direction shown by arrow H (counterclockwise).

Figure 11:
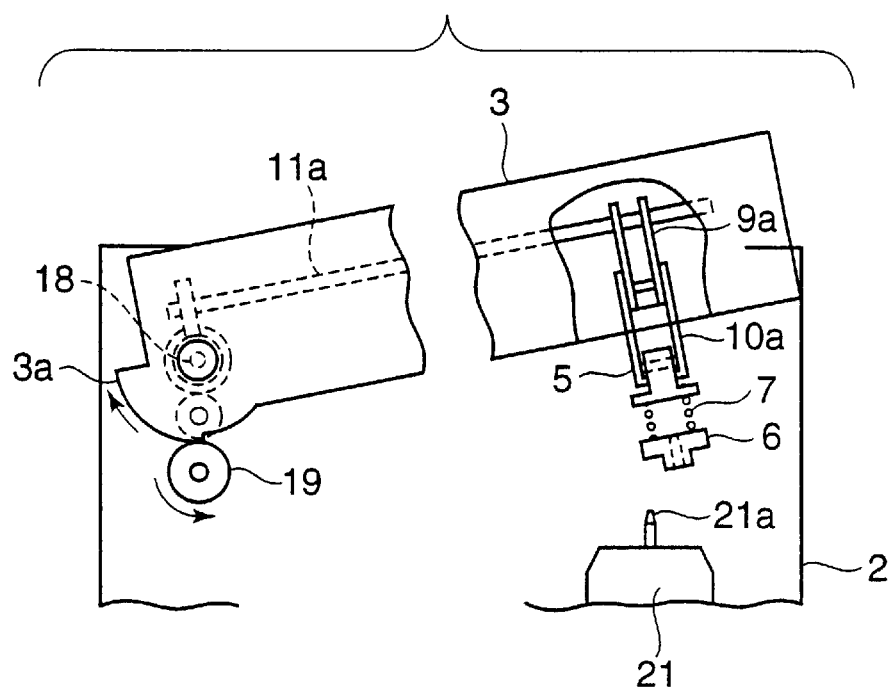
Figure 12:
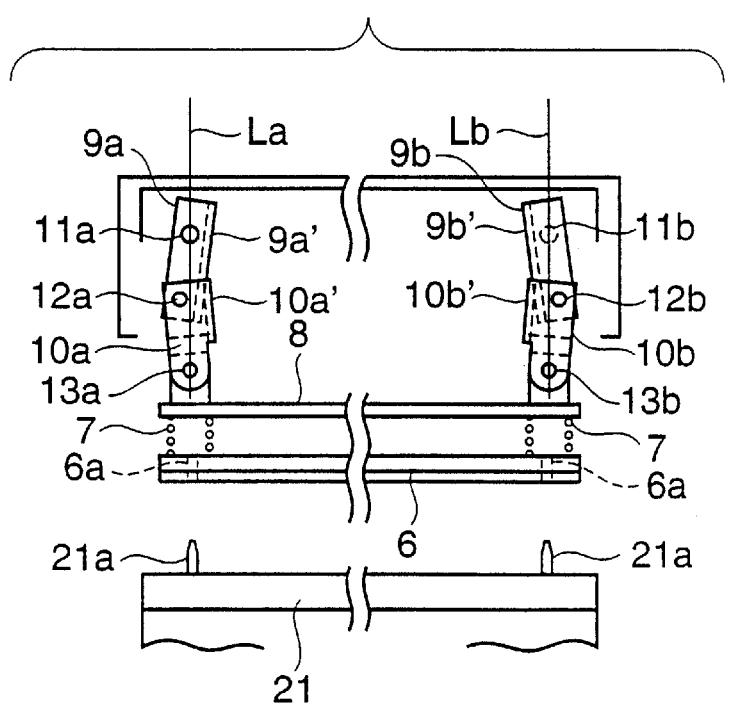

As shown in FIG. 11, the clockwise rotation of the support shaft 11a causes the base link 9a and interconnecting link 10a to gradually open from their collapsed state. The counterclockwise rotation of the support shaft 11b causes the base link 9b and the interconnecting link 10b to gradually open from their collapsed state. The coupling pins 12a and 12b will have moved outside of the lines La and Lb, respectively, as shown in FIG. 12, before the sector gear 3a moves out of meshing engagement with the main upper gear 19 as shown in FIG. 11. Thus, in FIG. 12, the upper end corners 10a' and 10b' of the U-shaped interconnecting links 10a and 10b abut the common parts 9a' and 9b' of the U-shaped base links 9a and 9b, thereby preventing the interconnecting links 10a and 10b from further pivoting. At this moment, neither a compressive force nor a tensile force is exerted to the compression coil spring 7.

As the lid 3 is further closed, the sector gear 3a moves out of engagement with the main gear 19 but the worm gear 17a and 17b cause the interconnecting links 10a and 10b and the base links 9a and 9b to stay at their positions. Then, the pilot pins 21a and 21b enter the engagement holes 6a and 6b formed in the LED head 6, thereby placing the LED head 6 in position above the image-forming unit 21.

When the LED head 6 is positioned above the image-forming unit 21, the compression spring 7 starts to be compressed so that the spring 7 urges the interconnecting links 10a and 10b and the base links 9a and 9b. However, the worm gears 17a and 17b prevent the base links 9a and 9b from pivoting, and the upper end corners 10a' and 10b' of the interconnecting links 10a and 10b abut the common parts 9a and 9b of the base links 9a and 9b. Therefore, the interconnecting links 10a and 10b and the base links 9a and 9b are not collapsed but remain positioned over the image-forming unit 21 as shown in FIG. 12. Subsequently, the lid 3 is pivoted further in the closing direction so that the compression spring 7 exerts a large biasing force on the LED head 6. After the lid 3 has been completely closed, the operator locks the lid 3 to the body 2 by operating a fastening means, not shown.

The first embodiment is advantageous in that the LED head assemblies 5 do not obstruct the operator's hands and it is only necessary for the operator to open the lid 3 through a small pivotal angle because the LED head assemblies 5 collapses into a small size.

Second Embodiment

{Construction}

Figure 13:
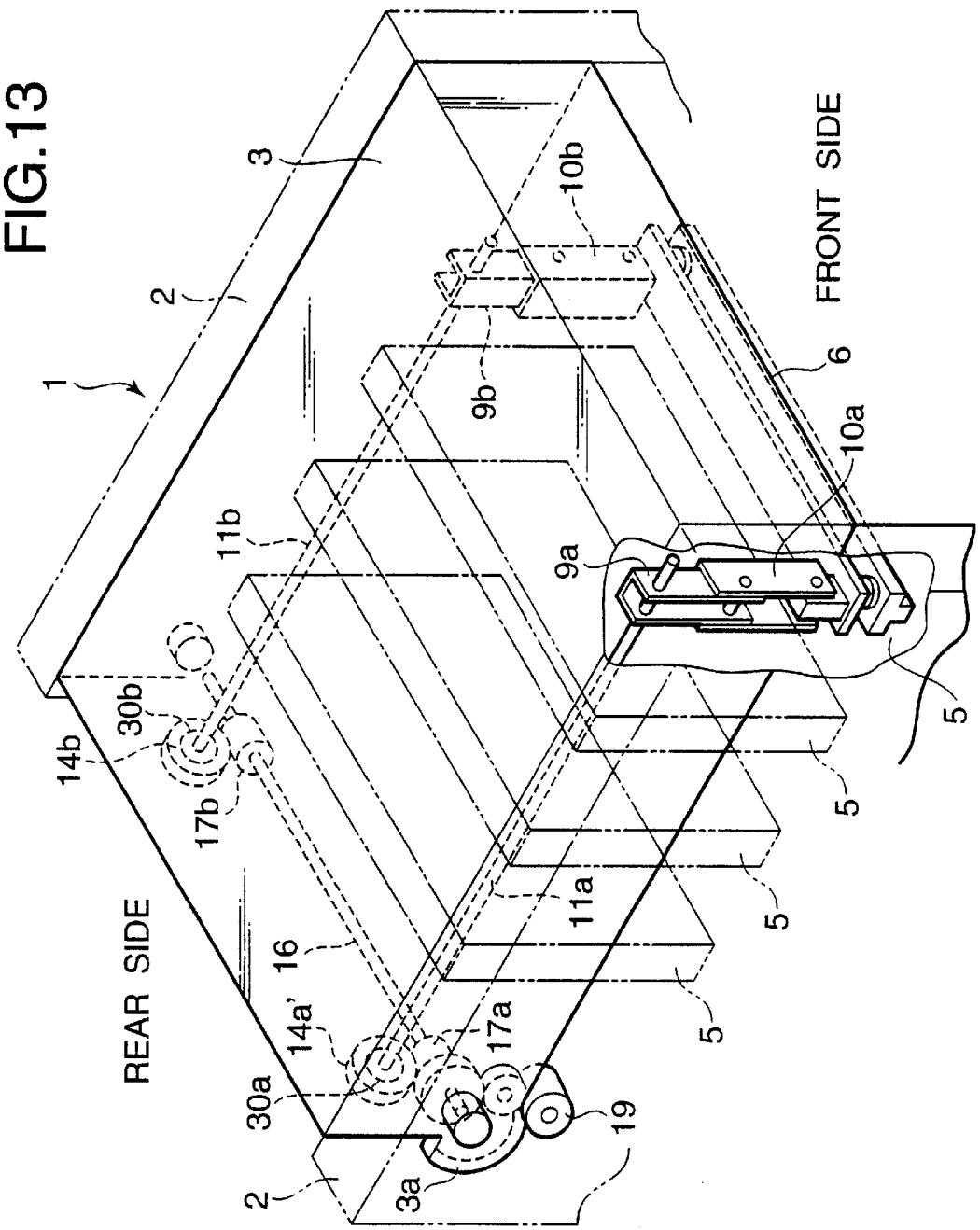
FIG. 13 is a perspective view of a pertinent portion of an electrophotographic printer according to a second embodiment.

FIG. 13 is a perspective view of a pertinent portion of an electrophotographic printer according to a second embodiment.

Figure 14:
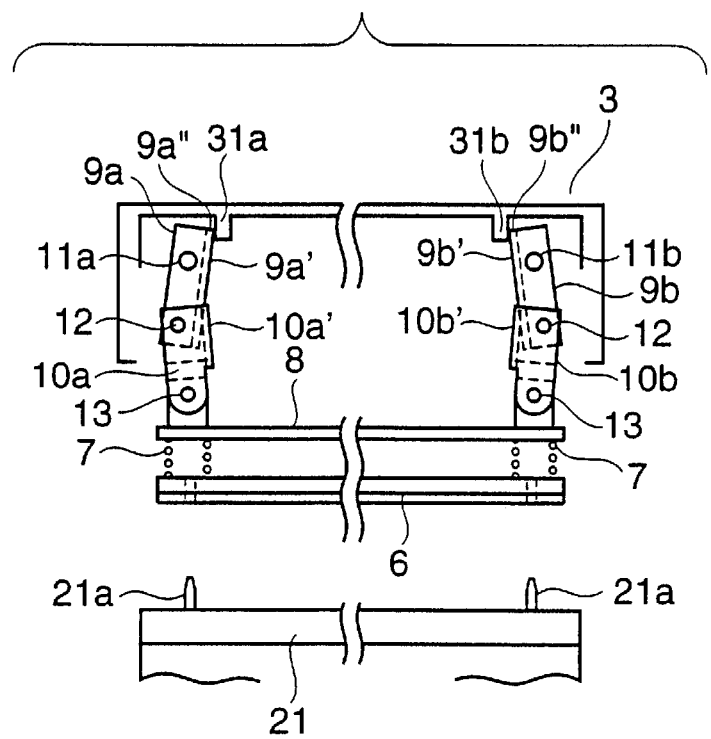
FIG. 14 is a fragmentary plan view illustrating the second embodiment.

FIG. 14 is a fragmentary plan view illustrating the second embodiment.

Referring to FIG. 13, the rear end portions of the support shafts 11a and 11b are firmly supported by means of torque limiters 30a and 30b. The torque limiters 30a and 30b each include an inner ring member and an outer ring member. When a torque smaller than a predetermined value acts on the inner and outer ring members, the inner and outer ring members rotate together. When a torque larger than the predetermined value acts on the inner and outer ring members, one ring member rotates relative to the other with a certain torque acting on them.

Referring to FIG. 14, the stoppers 31a and 31b are provided on the inner surface of the lid 3 and restrict the rotation of the base links 9a and 9b. The rest of the construction is the same as the first embodiment.

{Operation of the Second Embodiment}

{Opening Operation}

Figure 15:
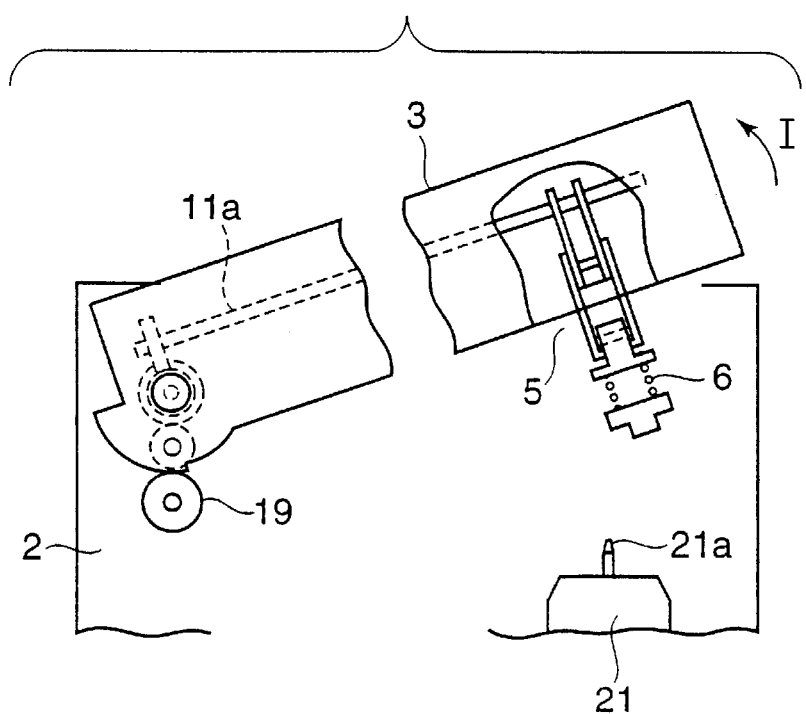
FIGS. 15–17 illustrate the operation of the second embodiment.
Figure 16:
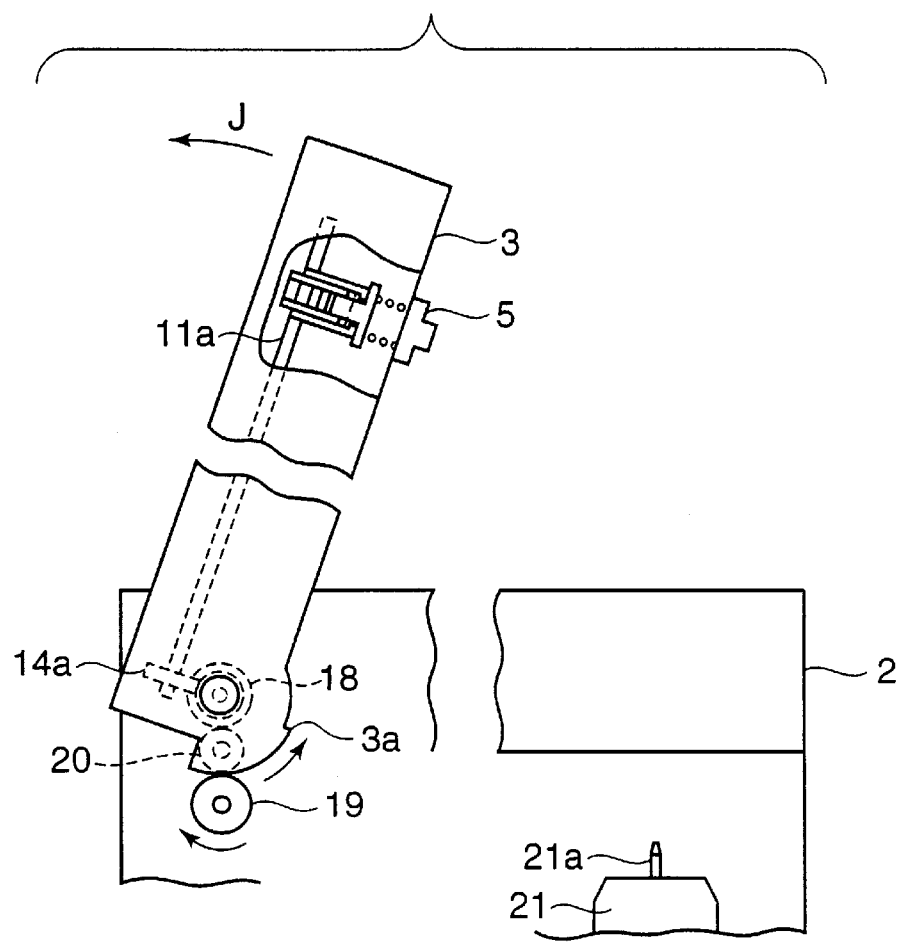
Figure 17:
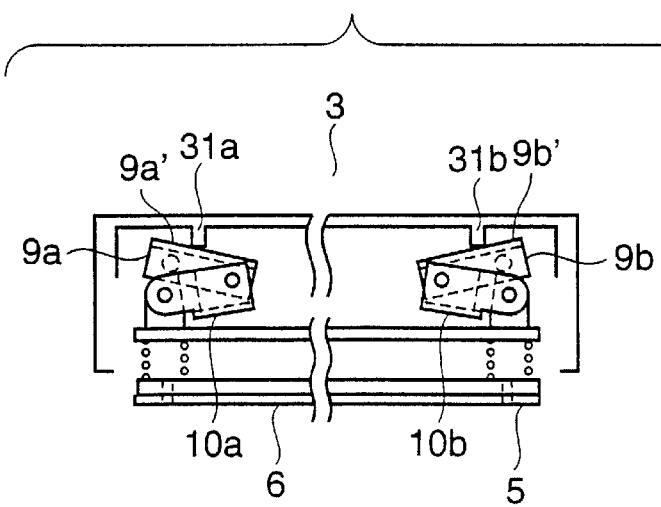

FIGS. 15–17 illustrate the operation of the second embodiment.

The opening operation of the lid of the second embodiment will now be described with reference to FIGS. 15–17.

Just as in the first embodiment, when the lid 3 has been completely closed, the upper end corners 10a' and 10b' of the interconnecting links 10a and 10b abut the upper common parts 9a' and 9b' of the base links 9a and 9b. Therefore, the interconnecting links 10a and 10b are prevented from pivoting and the compression springs 7 urge the LED head 6 against the image-forming unit 21 and the sector gear 3a has not been in meshing engagement with the main gear 19 yet.

Referring to FIG. 15, when the operator opens the lid 3, the lid 3 pivots in a direction shown by arrow I but the sector gear 3a is not in meshing engagement with the main gear 19 until the lid 3 opens to an angle greater than a predetermined value. Before the sector gear 3a moves into meshing engagement with the main gear 19, the LED head 6 will have moved out of engagement with the pilot pins 21a and 21b of the image-forming unit 21. When the lid 3 is further opened, the sector gear 3a moves into meshing engagement with the main gear 19, so that the main gear 19 starts to rotate clockwise. The rotation of the main gear 19 is transmitted to the idle gear 18 through the sub gear 20, and then to the support shafts 11a and 11b through the worm gears 17a and 17b and worm wheels 14a and 14b. As a result, as described in the first embodiment, the base links 9a and 9b and the interconnecting links 10a and 10b collapse into a folded position, so that the LED assemblies 5 are collapsed from their expanded positions to their collapsed positions.

When the lid 3 is still further opened, the upper end corners 9a' and 9b' of the base links 9a and 9b abut the stoppers 31a and 31b as shown in FIG. 17, and the base links and interconnecting links are not further collapses.

As shown in FIG. 16, if the operator attempts to further open the lid 3 in the direction shown by arrow J, the lid 3 can be opened with the support shafts 11a and 11b not rotated. This is because the torque limiters 30a and 30b becomes operative, so that the pivotal motion of the lid 3 is transmitted to the worm gears 17a and 17b of the relay shaft 16 and not from the worm gears 17a and 17b to the worm wheels 14a and 14b.

When the lid 3 has been completely opened, the operator replaces the cartridge and/or the image-forming unit or removes jammed paper. At this moment, just like the first embodiment, the LED head assemblies 5 are at their collapsed positions, facilitating replacement of the cartridge and/or image-forming unit or removal of the jammed paper.
{Closing Operation}

The closing operation of the lid 3 will now be described with reference to FIGS. 15 and 16.

When the lid 3 is fully opened, the sector gear 3a is in mesh with the main gear 19. When the operator starts to close the lid 3 from this position, the sequence of the aforementioned opening operation is reversed so that the base links 9a and 9b and the interconnecting links 10a and 10b gradually open from their collapsed position.

Before the lid 3 is closed to the position shown in FIG. 15 where the sector gear 3a moves out of engagement with the main gear 19, the coupling pins 12a and 12b will have become outside of the lines La and Lb (FIG. 12), respectively. The upper end corners 9a" and 9b" of the base links 9a and 9b abut the stoppers 31a and 31b to prevent the basing links 9a and 9b from pivoting.

When the lid 3 has been fully opened, the interconnecting links 10a and 10b and the base links 9a and 9b are in their expanded positions as shown in FIG. 14 and the torque limiters 30a and 30b remain operative. In this situation, the torque limiters 30a and 30b operate so that the rotation of the lid 3 is not transmitted to the support shafts 11a and 11b. In other words, the lid 3 can. pivot further in the closing direction with the support shafts 11a and 11b not rotating. If the gear ratio is designed such that the support shafts 11a and lib rotate a larger number of times for the same amount of pivotal motion of the lid 3, then the interconnecting links 10a and 10b and the base links 9a and 9b operate as follows. When the lid 3 is closed from its fully opened position, the interconnecting links 10a and 10b and the base links 9a and 9b move into their fully expanded positions when the lid 3 is still wide open. When the lid 3 is opened from its fully closed position, the interconnecting links 10a and 10b and the base links 9a and 9b move into their fully collapsed positions when the lid 3 is not wide open yet.

Conversely, if the gear ratio is designed such that the support shafts 11a and 11b rotate a smaller number of times for the same amount of pivotal motion of the lid 3, then the interconnecting links 10a and 10b and the base links 9a and 9b are in their expanded positions when the lid 3 is still wide open.

When the lid 3 is further pivoted in the closing direction, the sector gear 3a moves out of engagement with the main gear 19. Then, the worm gears 17a and 17b hold the interconnecting links 17a and 17b and the base links 9a and 9b at their positions, and the pilot pins 21a and 21b of the image-forming unit 21 move into engagement with the engagement holes 6a and 6b formed in the LED head 6. Thus, the LED head 6 is placed in position with respect to the image-forming unit 21.

Since the LED head 6 is positioned on the image-forming unit 21, the compression springs 7 are compressed such that the urging forces of the compression springs 7 act on the interconnecting links 10a and 10b and the base links 9a and 9b. However, the upper end corners 9a" and 9b" of the base links 9a and 9b abut the stoppers 31a and 31b. In addition, the upper end corners 10a' and 10b' of the interconnecting links 10a and 10b abut the common parts 9a' and 9b' of the base links 9a and 9b having a U-shaped cross section. Therefore, the overall structure of the base links 9a and 9b the interconnecting links 10a and 10b is prevented from buckling, placing the LED head 6 positioned above the image-forming unit 21. Since the interconnecting links 10a and 10b and base links 9a and 9b do not collapse, the compression springs 7 exert large urging forces on the LED head 6 so that the LED head 6 is positioned relative to the image-forming unit 21. When the lid 3 has been completely closed, the operator locks the lid 3 to the body by means of a fastening means, not shown.

As described above, the second embodiment provides the same advantages as the first embodiment. In addition, the use of the torque limiters 30a and 30b allows the lid 3 to be opened wider or to a desired position. The second embodiment has been described with respect to a case where when the lid 3 has been completely closed, the sector gear 3a is not in mesh with the main gear 19. However, the mechanism may also be designed such that the sector gear 3a is in mesh with the main gear at all times.

Third Embodiment
{Construction}

Figure 18:
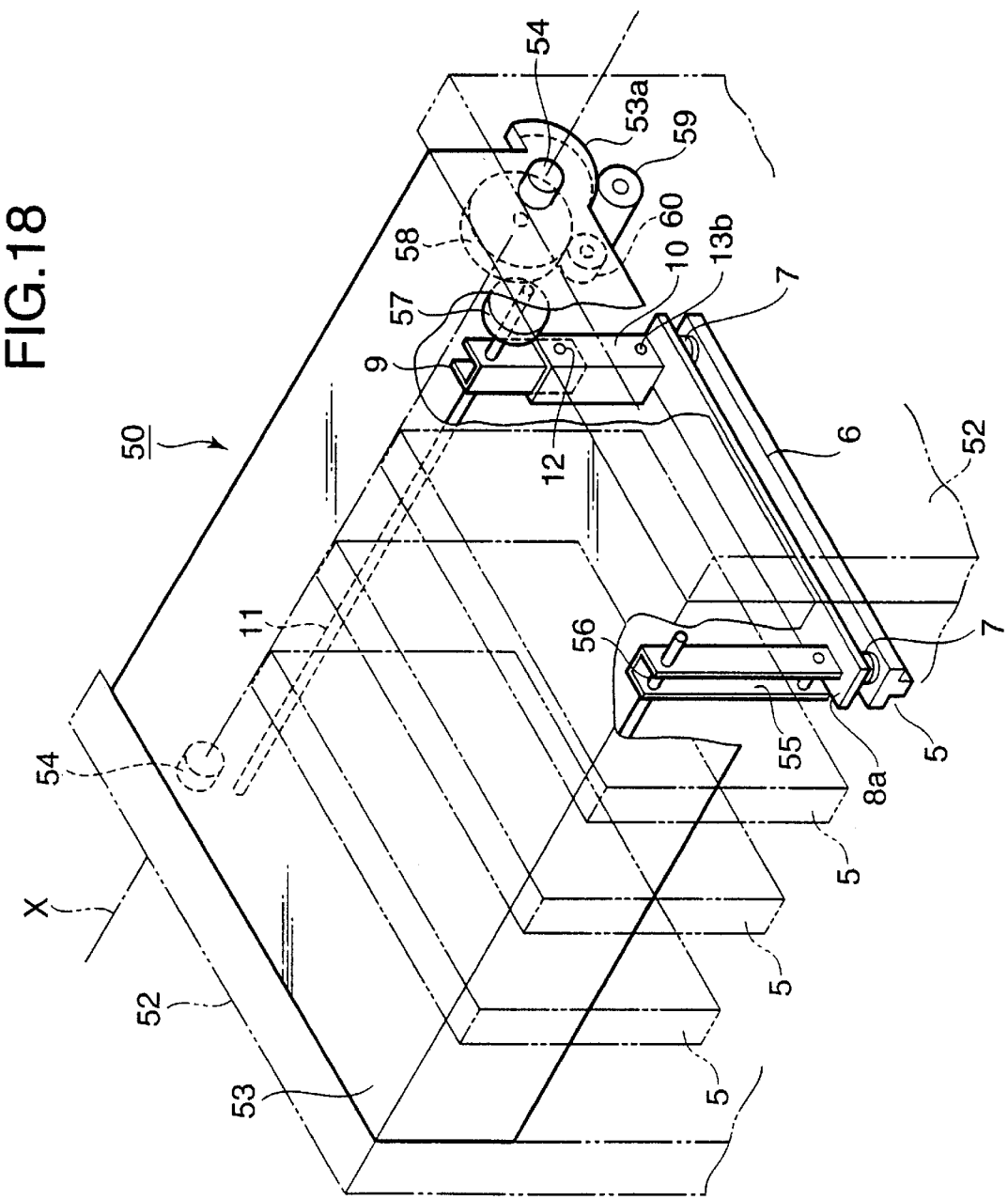
FIG. 18 is a perspective view of a pertinent portion of an electrophotographic printer according to a third embodiment.

FIG. 18 is a perspective view of a pertinent portion of an electrophotographic printer according to a third embodiment.

Figure 19:
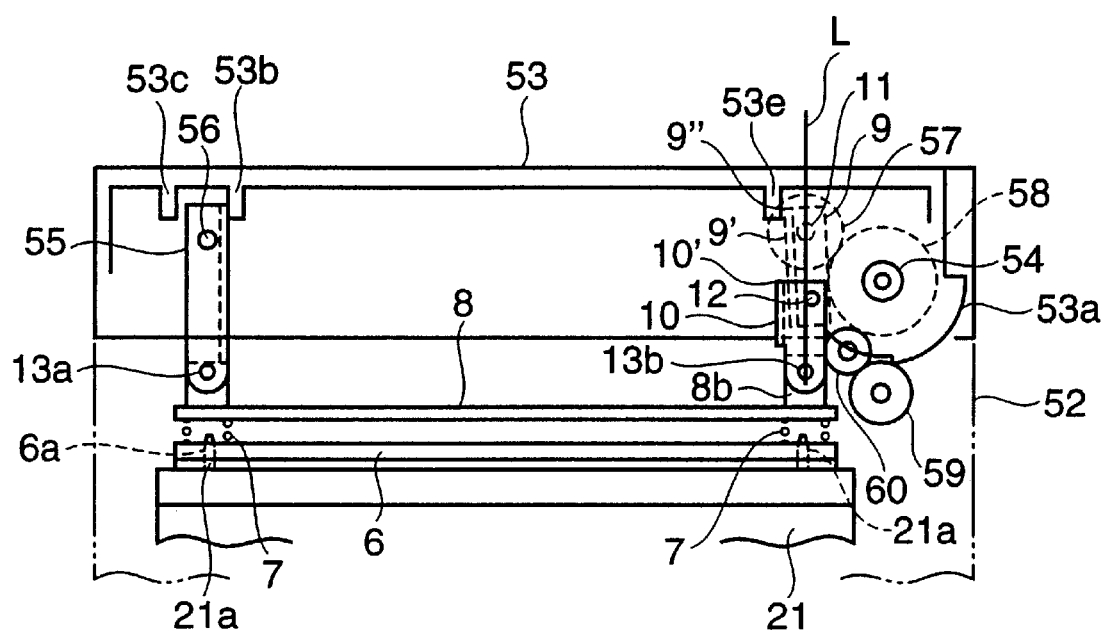
FIG. 19 is a fragmentary view of a pertinent portion of the third embodiment.

FIG. 19 is a fragmentary view of a pertinent portion of the third embodiment.

Figure 20:
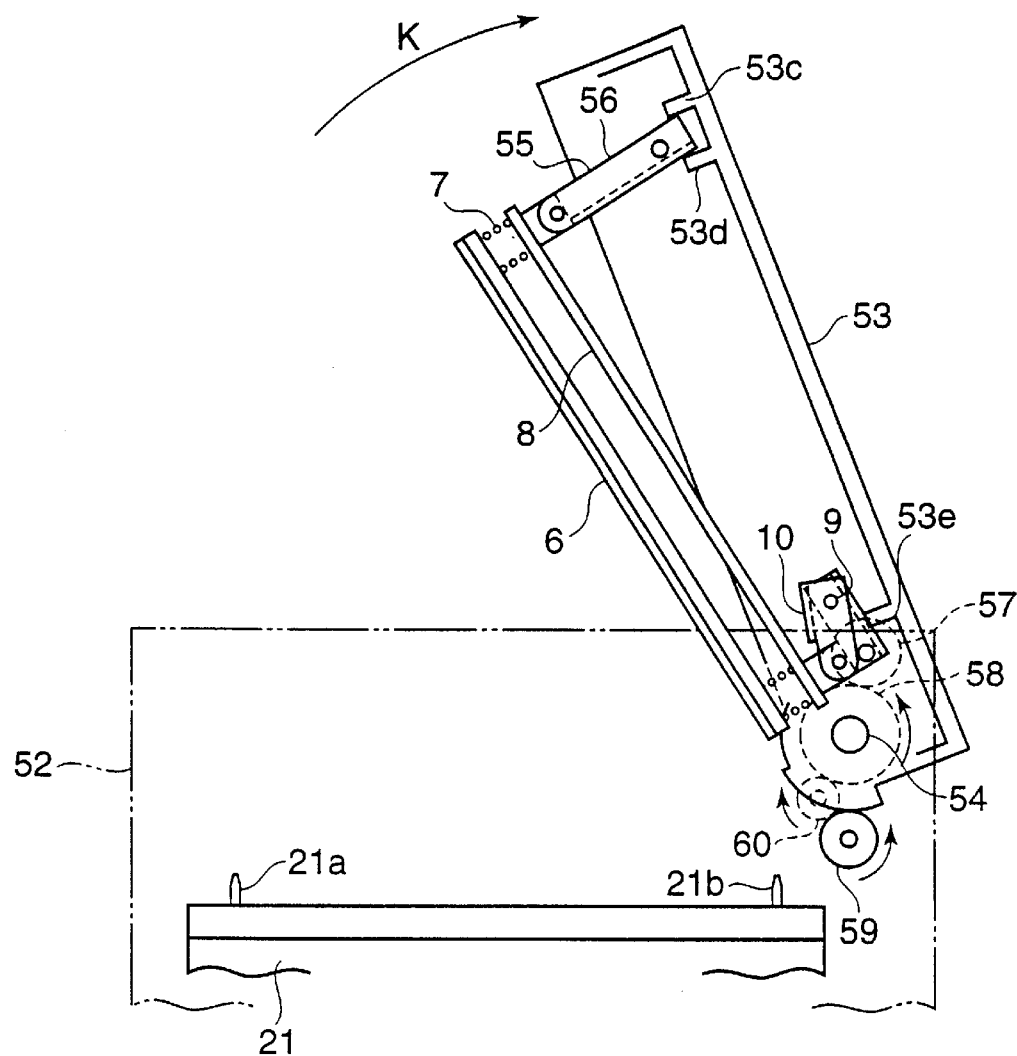
FIG. 20 is a side view of a pertinent portion of the third embodiment.

FIG. 20 is a side view of a pertinent portion of the third embodiment.

The third embodiment is characterized in that a lid has supporting projections that extend perpendicular to the longitudinal direction of the LED head.

Referring to FIGS. 18–20, an electrophotographic printer has a lid 53 pivotally mounted to a frame 52 of the printer such that the lid 53 can be opened and closed. The lid 53 has a pair of supporting projections 54 on the left and right sides of the printer so that the lid 53 is rotatably mounted to the frame 52 by means of the supporting projections 54. A sector gear 53a is formed in one-piece construction with the lid 53, the sector gear 53a rotating about an axis passing through the centers of the supporting projections 54. There are provided four LED assemblies 5 on the inner side of the lid 53, the LED assemblies 5 being positioned such that each of the LED assemblies 5 extends in a direction perpendicular to the axis passing through the supporting projections 54.

Each of the LED assemblies 5 includes the LED head 6, a pair of compression coil springs 7, a support plate 8, a base link 9, an interconnecting link 10, and a long link 55. The base link 9, interconnecting link 10, and long link 55 have a U-shaped cross-section. The base link 9 and interconnecting link 10 are disposed on a rear side of the lid 3 (i.e., near rotational axis X). The long link 55 is disposed on a front side of the lid 3 (i.e., the side remote from the rotational axis X). The base link 9, interconnecting link 10, and the long link 55 cooperate to support the LED head 6.

A support shaft 11 extends parallel to the pivotal axis of the lid 53 and is rotatably mounted on the rear side of the lid 53 by means of bearings, not shown. The upper end portion of the base link 9 is fixed to the support shaft 11 so that the rotation of the support shaft 11 causes the base link 9 to pivot. The lower end portion of the base link 9 enters the upper end portion of the interconnection link 10 such that the base link 9 and the interconnecting link 10 are pivotally coupled by a coupling pin 12 to each other.

As shown in FIG. 19, the interconnecting link 10 can sufficiently pivot counterclockwise with respect to the base link 9 but is prevented from rotating clockwise because the upper end corner 10' of the interconnecting link 10 abuts the common parts 9' of the base link 9. The interconnecting link 10 stops pivoting at a position where the coupling pin 12 becomes outside of a line L connecting the support shaft 11 and the coupling pin 13b. The lower end portion of the interconnecting link 10 and an upward projection 8b of the support plate 8 are coupled together by means of the coupling pin 13b such that they are pivotal to each other.

The long link 55 has an upper end portion rotatably supported on a coupling pin 56 formed on the inner side of the lid 53, and a lower end portion coupled to the projection 8b of the support plate 8 by means of the coupling pin 13a. The lid 53 has opposing stoppers 53b and 53c formed on the inner surface thereof with the upper end portion of the long link 55 between the stoppers 53b and 53c. The stoppers 53b and 53c restrict the motion of the long link 55 such that the long link 55 can pivot only in a limited range. The lid 53 also has a stopper 53e formed on the inner surface thereof, the stopper 53e being located at an upper left side of the base link 9 in FIG. 19.

Figure 21:
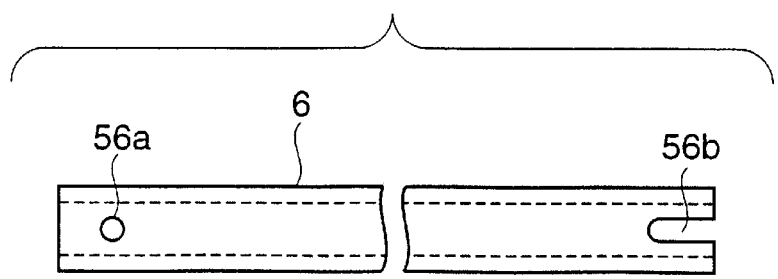
FIG. 21 is the bottom view of the LED head 6.

FIG. 21 is the bottom view of the LED head 6.

There are provided compression springs 7 under longitudinal ends of the support plate 8. Each of the springs 7 has one end connected to the support plate 8 and the other end connected to the LED head 6. In other words, the LED head 6 is suspended from the support plate 8 via the springs 7. The LED head 6 has an engagement hole 56a formed in one of the longitudinal ends thereof and a U-shaped cutout 56b formed in the other.

Referring back to FIG. 19, there are provided image-forming units 21 under the respective LED head assemblies 5. Each of the image-forming units 21 has pilot pins 21a and 21b corresponding to the engagement hole 56a and the cutout 56b formed in the, corresponding LED head 6, respectively. The pilot pins 21a and 21b enter the engagement hole 56a and cutout 56b, respectively, so that the LED head 6 is placed in position.

The support shaft 11 has a gear 57 fixedly mounted to an end portion of the support shaft 11. There is provided a relay gear 58 that rotates about an axis passing through the pair of supporting projections 54 and is in mesh with the gear 57. The main gear 59 is rotatably supported on a rear side of the lid 53 where the sector gear 53a is formed. The main gear 59 is in mesh with the sector gear 53a. A sub gear 60 is rotatably provided which is in mesh with both the main gear 59 and the relay gear 58.

With the aforementioned gear mechanism, the pivotal motion of the lid 53 is transmitted through the sector gear 53a from the main gear 59 through the sub gear 60 to the relay gear 58. The rotation is further transmitted through the gear 57 to the support shaft 11. As shown in FIG. 19, when the lid 53 has been completely closed, the sector gear 53a and the main gear 59 are not in mesh with each other.

{Operation of the Third Embodiment}

The operation of the third embodiment will now be described.

When the lid 3 has been completely closed, the upper end corner 10' of the interconnecting link 10 abuts a bottom part of the U-shaped base link 9 so that the interconnecting link 10 is prevented from further pivoting and the LED head assemblies 5 are fixedly placed in position. When the lid 53 has been completely closed, the sector gear 53a and the main gear 59 are not in mesh with each other.

{Opening Operation}

When the user unlocks a fastening means, not shown, and opens the lid 53 from the fully closed position (FIG. 19), the lid 53 pivots. The sector gear 53a is not in meshing engagement with the main gear 59 until the lid 53 has pivoted beyond a predetermined angle. If the lid 53 is further opened in a direction shown by arrow K in FIG. 20 beyond the predetermined angle, then the sector gear 53a moves into meshing engagement with the main gear 59, so that the main gear 59 rotates counterclockwise. The rotation of the main gear 59 is transmitted through the sub gear 60 to the relay gear 58 and further to the support shaft 11 through the gear 57. Just like the first embodiment, the rotation of the support shaft 11 causes the base links 9 and interconnecting links 10 to collapse so that each of the LED head assemblies 5 moves from its extended position to its collapsed position.

As shown in FIG. 20, as the base link 9 and interconnecting link 10 are folded one over the other, the long link 55 pivots counterclockwise slightly about the coupling pin 56 until the upper end of the long link 55 abuts the limiter 53c.

As the lid 53 is further opened, the upper portion 9' of the base link 9 abuts the stopper 53e as shown in FIG. 20, the limiter 53e preventing the base link W and the interconnecting link 10 from further collapsing. When the LED head assembly 5 takes the position shown in FIG. 20, the collapse of one end of the LED head assembly 5 is completed. When the lid 53 is fully opened, the lid 53 can be at an angle that is greater than 90 degrees just as in the first embodiment.

After the lid 53 has been opened fully, the operator replaces the toner cartridge and/or image-forming unit or removes jammed paper. Because one end of the LED head assembly 5 has collapsed, the LED head assembly 5 does not interfere with the operator's hands.

{Closing Operation}

The closing operation of the lid 53 will be described.

When the lid 53 is fully opened, the sector gear 53a is still in mesh engagement with the main gear 59. As the lid 53 is closed from where it is fully opened, the rotations of the associated parts of the mechanism are reversed with respect to the opening operation of the lid 53. In other words, the base links 9 and the interconnecting links 10 will move from their collapsed positions toward their expanded positions. The coupling pin 12 will be outside of the line L (FIG. 19) that connects the support shaft 11 and the coupling pin 13 before the sector gear 53a moves out of engagement with the main gear 59. When the shaft 12 is outside of the line L, the upper end portion 9" of the base link 9 abuts the stopper 53e and the upper end corner 10' of the interconnecting link 10 abuts the common part 9' of the base link 9. Thus, the base link 9 and interconnecting link 10 are prevented from further rotating as shown in FIG. 19 where the long link 55 extends substantially perpendicular to the upper surface of the lid 53.

As the lid 53 is further closed, the sector gear 53a moves out of meshing engagement with the main gear 59 and the pilot pins 21a and 21b move into fitting engagement with the engagement hole 56a and U-shaped, respectively, thereby placing the LED head 6 in position with respect to the image-forming unit 21.

Because the LED head 6 is positioned above the image-forming unit 21, the compression spring 7 is compressed so that the reaction force of the compression spring 7 is exerted on the interconnecting link 10, base link 9, and long link 55. The interconnecting link 10, base link 9, and long link 55 do not buckle but hold the LED head assembly 5 in position relative to the image-forming unit 21. The compression spring 7 exerts a large reaction force on the LED head 6, thereby firmly positioning the LED head 6 relative to the image-forming unit 21. When the lid 53 has been fully closed, the user locks the lid 53 to the body 2 by a fastening, not shown.

The third embodiment may be applicable to a printer where a pivot pin of the lid extends perpendicular to the longitudinal dimension of the LED heads. In such a printer, as the lid is opened, the LED head assemblies are partially collapsed to facilitate the replacement of the toner cartridge.

The third embodiment has been described with respect to a case where when the lid is opened, one end of the LED assembly collapses. However, the LED head assembly may be constructed such that the entire LED head assembly collapse just like the first and second embodiments.

While the first to third embodiments have been described with respect to a case where all of four LED assemblies collapse, the printer may be designed such that only one or two LED head assemblies collapse. A motor can be provided on the body for driving the interconnecting link and base link to collapse, in which case, the mechanism should be designed such that the mechanism move into a collapsed position and an expanded position only when the lid is closed. In other words, the motor is energized such that the mechanism is completely collapsed before the user starts to open the lid and the mechanism starts to move into the expanded position after the lid has been fully closed.

The first to third embodiments have been described with respect to a case where the LED head assemblies are mounted on the lid of the apparatus. However, the present invention can also be applied to apparatus where the LED head assemblies are provided on the inner lid assembly of the apparatus. Although, the embodiments have been described with respect to an LED head as an exposing unit, the invention may be applied to an apparatus incorporating other type of exposing unit that employs a semiconductor laser.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An electrophotographic recording apparatus having a lid movable to open and close relative to a body of the apparatus, the lid having an exposing unit mounted thereto, the apparatus comprising:
   an extendable mechanism provided between the lid and the exposing unit, said extendable mechanism being selectively deformable into a retracted position and into an extended position; and
   a drive mechanism, driving said extendable mechanism to deform selectively into the retracted position and the extended position,
   wherein said extendable mechanism causes the exposing unit to move toward the lid when the lid is opened, and said extendable mechanism causes the exposing unit to move away from the lid when the lid is closed.

2. The electrophotographic recording apparatus according to claim 1, wherein when said lid is opened and closed, said drive mechanism operates operatively with the lid to cause said extendable mechanism to be selectively deformed into the retracted position and into the extended position.

3. The electrophotographic recording apparatus according to claim 2,
   wherein the exposing unit extends longitudinally and has a first longitudinal end and a second longitudinal end, and
   wherein when the lid is opened, one of the first and second longitudinal ends is moved to the retracted position.

4. The electrophotographic recording apparatus according to claim 2,
   wherein the exposing unit is mounted to said extendable mechanism through a biasing member, and
   wherein when the lid is closed, said extendable mechanism is deformed into the extended position so that the exposing unit is placed in position with respect to an image-forming unit and the biasing member urges the exposing unit against the image-forming unit.

5. The electrophotographic recording apparatus according to claim 2, wherein the exposing unit extends substantially parallel to an axis about which the lid pivots to open and close.

6. The electrophotographic recording apparatus according to claim 2, wherein the exposing unit extends in a direction substantially perpendicular to an axis about which the lid pivots to open and close.

7. The electrophotographic recording apparatus according to claim 6,
   wherein the exposing unit extends longitudinally and has a first longitudinal end and a second longitudinal end, and
   wherein when the lid is opened, one of the first and second longitudinal ends is moved to the retracted position.

8. The electrophotographic recording apparatus according to claim 1, wherein said extendable mechanism extends and retracts in directions substantially normal to a plane in which the lid lies.

9. An electrophotographic recording apparatus having a lid movable to open and close relative to a body of the apparatus, the lid having an exposing unit mounted thereto, the apparatus comprising:
   an extendable mechanism selectively deformable into a retracted position and into an extended position; and
   a drive mechanism, driving said extendable mechanism to deform selectively into the retracted position and the extended position, said drive mechanism including a torque limiter,
   wherein said extendable mechanism causes the exposing unit to move toward the lid when the lid is opened, and said extendable mechanism causes the exposing unit to move away from the lid when the lid is closed,
   wherein when said lid is opened and closed, said drive mechanism operates operatively with the lid to cause said extendable mechanism to be selectively deformed into the retracted position and into the expanded position,
   wherein the exposing unit is mounted to said collapsible mechanism through a biasing member, and
   wherein when the lid is closed, said collapsible mechanism is deformed into the extended position so that the exposing unit is placed in position with respect to an image-forming unit and the biasing member urges the exposing unit against the image-forming unit.

10. The electrophotographic recording apparatus according to claim 9, wherein the lid is pivotally mounted to the apparatus so that the lid is pivotal about an axis, and said extendable mechanism is provided near the axis.

11. An electrophotographic recording apparatus having a lid movable to open and close relative to a body of the apparatus, the lid having an exposing unit mounted thereto, the apparatus comprising:

an extendable mechanism selectively deformable into a retracted position and into an extended position; and a gear mechanism, driving said extendable mechanism to deform selectively into the retracted position and the extended position, wherein said extendable mechanism causes the exposing unit to move toward the lid when the lid is opened, and said extendable mechanism causes the exposing unit to move away from the lid when the lid is closed, and wherein when said lid is opened and closed, said drive mechanism operates operatively with the lid to cause said extendable mechanism to be selectively deformed into the retracted position and into the extended position.

\* \* \* \* \*